United States Patent Office 3,017,423
Patented Jan. 16, 1962

3,017,423
ORGANIC COMPOUNDS AND PROCESS
Barney J. Magerlein and Fred Kagan, Kalamazoo, Mich., assignors to The Upjohn Company, Kalamazoo, Mich., a corporation of Delaware
No Drawing. Filed May 29, 1959, Ser. No. 816,715
12 Claims. (Cl. 260—461)

This invention relates to novel phosphites and processes for their preparation and is more particularly concerned with novel phosphite esters of pantothenic acid and related compounds, and the alkali metal salts and alkaline earth metal salts thereof.

The novel compounds of the invention are selected from the class consisting of (a) compounds having the formula:

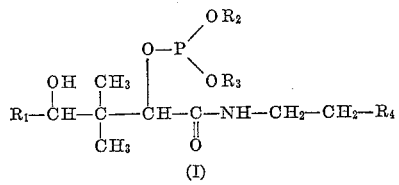

(I)

wherein $R_1$ is selected from the class consisting of hydrogen and methyl, $R_2$ and $R_3$ are selected from the class consisting of lower-alkyl, lower-alkenyl, lower-aralkyl, and lower-aryl, and $R_4$ is selected from the class consisting of —COOH and —SO$_3$H, and (b) the alkali metal and alkaline earth metal salts thereof.

The term "lower-alkyl" as used throughout the specification and claims means an alkyl radical containing from 1 to 6 carbon atoms, inclusive, such as methyl, ethyl, propyl, butyl, amyl, hexyl, and isomeric forms thereof. The term "lower-alkenyl" as used throughout the specification and claims means an alkenyl radical containing from 3 to 6 carbon atoms, inclusive, such as propenyl, butenyl, pentenyl, hexenyl, and isomeric forms thereof. The term "lower-aralkyl" as used throughout the specification and claims means an aralkyl radical containing from 7 to 13 carbon atoms, inclusive, such as benzyl, phenethyl, benzhydryl, and the like. The term "lower-aryl" as used throughout the specification and claims means an aryl radical containing from 6 to 12 carbon atoms, inclusive, such as phenyl, tolyl, xylyl, naphthyl, biphenylyl, and the like.

The novel compounds of the invention exhibit activity as metabolic regulators. Thus the compounds of Formula I in which $R_4$ is —COOH are growth promoters whereas the compounds of Formula I in which $R_4$ is —SO$_3$H are growth inhibitors. Illustratively, the compound pantothenic acid 2-diethyl phosphite exhibits pantothenic acid-like activity in promoting the growth of *Lactobacillus arabinosus*, *Lactobacillus casei*, and like lactic acid bacteria. The compound pantoyltaurine 2-diethyl phosphite exhibits activity as a pantothenic acid antagonist in inhibiting the growth of *Lactobacillus arabinosus*, *Lactobacillus casei*, and like lactic acid bacteria. The compounds of the invention which exhibit activity as pantothenic acid antagonists are useful in producing pantothenic acid deficiency in laboratory animals to be used in the study of metabolic deficiency states. Said compounds are also useful in the detection and assay of organisms, of which they inhibit the browth, such as *Lactobacillus arabinosus*, *Lactobacillus casei*, and the like, and are particularly useful for the selective inhibition and/or assay of such organisms when present in association with organisms whose growth is unaffected by said compounds.

Further the novel compounds of the invention are of value as intermediates in chemical synthesis and in the preparation of other biologically active agents. For example, the novel compounds of the invention can be converted to their lower-alkyl carboxylate and sulfonate esters and the latter condensed with β-mercaptoethylamine according to the process described in U.S. Patent 2,680,-767 for the conversion of pantothenic acid to pantetheine. There are thus obtained the phosphites of pantetheine and analogous compounds, which compounds and the corresponding disulfides to which they can be oxidized readily, are growth factors for microorganisms such as lactic acid bacteria. The novel compounds of the invention can also be converted to mixed acid anhydrides and the latter reacted with an S-arylmercaptoethylamine hydrochloride, according to the process described in U.S. Patent 2,857,-408 for the preparation of S-acylpantetheines from pantothenic acid, to give the phosphites of S-acylpantetheine and analogous compounds. The compounds so obtained possess the same growth-promoting activity as the corresponding non-acylated pantetheines but are more stable than the latter.

The novel compounds of the invention having the Formula I above can be prepared by reaction of a lactone phosphite having the formula:

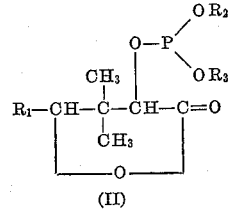

(II)

wherein $R_1$, $R_2$ and $R_3$ have the significance hereinbefore described, with an alkali metal or alkaline earth metal salt of a compound having the formula $$NH_2—CH_2—CH_2—R_4$$

wherein $R_4$ has the significance hereinbefore defined, in the presence of an inert solvent. Suitable solvents include the lower alkanols such as methanol, ethanol, isopropanol, and the like, liquid aliphatic polyhydroxy compounds such as ethylene glycol, propylene glycol, diethylene glycol, triethylene glycol, glycerol, and the like, and monoethers thereof such as methyl Carbitol, Carbitol, and butyl Carbitol (the methyl, ethyl, and butyl ethers, respectively, of diethylene glycol) and methyl Cellosolve, Cellosolve, and Butyl Cellosolve (the methyl, ethyl, and butyl ethers, respectively, of ethylene glycol).

It will be appreciated that the lactone phosphites having the Formula II above can exist in racemic form or as one of the optically active isomers. When the racemic form of a lactone phosphite is employed in the above process the compound having the Formula I obtained thereby will also be racemic. Where an optically active isomer of a lactone phosphite is employed in the above process the resulting compound having the Formula I will also be optically active. Both the racemic and the optically active forms of the compounds having the Formula I are within the scope of the present invention.

In a preferred embodiment of the process of the invention an alkali metal salt, preferably the sodium salt, of the compound $NH_2—CH_2—CH_2—R_4$ is prepared by dissolving the stoichiometric amount of the compound $NH_2—CH_2—CH_2—R_4$ in a solution of the alkali metal alkoxide in a lower alkanol. The solution so obtained is then admixed with the appropriate lactone having the Formula II above and the reaction mixture is maintained at a temperature of about 20° C. to about 30° C. for a period within the range of about 10 hours to about 24 hours. Preferably the reactants are employed in approximately stoichiometric proportions. There is thus obtained a solution of an alkali metal salt of the desired compound having the Formula I above. The latter compound can be isolated either as the said alkali metal salt or as the free acid by conventional procedures. For example, evaporation of the solution obtained in the above-described reaction yields the said alkali metal salt. The latter can be converted to the free acid by means known in the art, for example, by passage of an aqueous solution of the salt through a cation-exchange resin, for example, resins of the sulfonated styrene type, such as Dowex 50 (Dow Chemical Company), Permutit Q (Permutit Company), and Amberlite IR–120 (Rohm and Haas Company). The resulting solution of the desired free acid is then evaporated to dryness.

The alkali metal salts and alkaline earth metal salts of the invention can be prepared from the acids having the Formula I by conventional procedures. For example, the acids having the Formula I can be reacted with a stoichiometric proportion of the appropriate alkali metal or alkaline earth metal hydroxide or carbonate. Alternatively the alkali metal and alkaline earth metal salts of the invention can be prepared directly by condensing the appropriate salt of the compound $$NH_2—CH_2—CH_2—R_4$$

with a lactone having the Formula II. This reaction can be carried out as described above but is preferably carried out according to the procedures described in U.S. Patents 2,845,456 and 2,848,489 for the preparation of alkali metal salts and alkaline earth metal salts of pantothenic acid. The salts of the invention include the sodium, potassium, lithium, calcium, and barium salts of the compounds having the Formula I above.

The lactone phosphites having the Formula II above which are employed as starting materials in the process of the invention can be prepared by reaction of an hydroxy lactone having the formula:

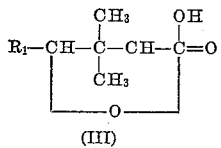

(III)

wherein $R_1$ has the significance hereinbefore defined with a phosphite ester

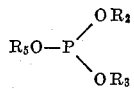

wherein $R_2$ and $R_3$ have the significance hereinbefore defined and $R_5$ is selected from the class consisting of lower-alkyl, lower-alkenyl, lower-aralkyl and lower-aryl. The reaction is carried out advantageously by heating the reactants together at a temperature within the range of about 90° C. to about 160° C. If desired the reaction can be conducted in the presence of an inert organic solvent such as toluene, xylene, cymene, and the like. The reaction time will vary according to the reaction temperature employed but is ordinarily within the range of about 4 to about 48 hours. The required compound having the Formula II above can be isolated from the reaction mixture by conventional methods, for example, by fractional distillation.

Compounds having the Formula II which are suitable for use in the process of the invention include pantolactone 2-diethyl phosphite, 3,3-dimethyl-γ-valerolactone 2-diethyl phosphite, pantolactone 2-diallyl phosphite, pantolactone di-(1-benzylethyl) phosphite, pantolactone 2-diphenyl phosphite, and the like.

The hydroxy lactones having the Formula III above, namely, pantolactone and 3,3-dimethyl-2-hydroxy-γ-valerolactone, which are employed as starting materials in the preparation of the lactone phosphites having the Formula II above, are well-known. For example, see Stiller et al., J. Am. Chem. Soc. 62, 1785 (1940), and Drell et al., ibid. 70, 2057 (1948).

Phosphite esters having the formula

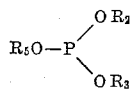

which are suitable for use in the preparation of the lactones having the Formula II can be prepared by methods well-known in the art. Thus, for example, they can be prepared by reaction of phosphorus trichloride with the appropriate alcohols, ammonia being added to keep the reaction product substantially neutral, according to the process described in U.S. Patent 2,678,940. Such esters include triethyl phosphite, tri-n-propyl phosphite, tri-n-butyl phosphite, tri-n-amyl phosphite, tribenzyl phosphite, benzyl diethyl phosphite, triphenyl phosphite, triallyl phosphite, trimethallyl phosphite, tri-2-butenyl phosphite, tri-(1-benzylethyl) phosphite, triphenethyl phosphite, tri-(3-phenylpropyl) phosphite, phenyl diethyl phosphite, phenyl di-m-tolyl phosphite, and the like.

The following examples are illustrative of the processes and products of the present invention, but are not to be construed as limiting.

EXAMPLE 1.—D(+)PANTOTHENIC ACID 2-DIETHYL PHOSPHITE (a) *D(—)pantolactone 2-diethyl phosphite*

In a 1-liter flask fitted with reflux condenser, were placed 130 g. (1.0 mole) of D(—)pantolactone (Stiller et al., supra) and 166 g. (1.0 mole) of triethyl phosphite. After heating under reflux for 20 hours the reaction mixture was distilled under reduced pressure. The fractions which distilled were unchanged triethyl phosphite having a boiling point of 48 to 53° C. at a pressure of 16 mm. of mercury, unchanged pantolactone having a boiling point of 119 to 123° C. at a pressure of 15 mm. of mercury, and the required product having a boiling point of 151 to 155° C. at a pressure of 15 mm. of mercury. The latter fraction was redistilled under reduced pressure. There was thus obtained D(—)pantolactone 2-diethyl phosphite monohydrate in the form of a liquid having a boiling point of 88° C. at a pressure of 0.1 mm. of mercury; $n_D^{25}$ 1.4536.

*Analysis.*—Calcd. for $C_{10}H_{19}O_5P \cdot H_2O$: C, 44.77; H, 7.89; P, 11.55; $H_2O$, 6.71. Found: C, 44.43; H, 7.89; P, 11.81; $H_2O$, 7.03.

In a similar manner, but replacing triethyl phosphite by tri-n-propyl phosphite, tri-n-butyl phosphite, tri-n-amyl phosphite, tribenzyl phosphite, triphenyl phosphite, triallyl phosphite, trimethallyl phosphite, tri-2-butenyl phosphite, tri-(1-benzylethyl) phosphite, and triphenethyl phosphite, there are obtained D(—)pantolactone 2-di-n-propyl phosphite, 2-di-n-butyl phosphite, 2-di-n-amyl phosphite, 2-dibenzyl phosphite, 2-diphenyl phosphite, 2-diallyl phosphite, 2-dimethallyl phosphite, 2-di-2-butenyl phosphite, 2-di-(1-benzylethyl) phosphite, and 2-diphenethyl phosphite, respectively.

(b) *D(+)pantothenic acid 2-diethyl phosphite*

To a solution of 0.253 g. (0.011 mole) of sodium in 5 ml. of absolute methanol was added, with stirring, 1.0 g. (0.011 mole) of β-alanine. Solution was complete in 30 minutes. To the solution so obtained was added a solution of 2.75 g. (0.0103 mole) of D(—)pantolactone 2-diethyl phosphite in 5 ml. of methanol and the mixture was stirred at a temperature of approximately 25° C. for 17 hours. The reaction mixture was then evaporated to dryness under reduced pressure. The residue was dissolved in the minimum quantity of methanol and the solution was poured into an excess of acetone. The oil which separated was isolated by decantation and dissolved in 200 ml. of water. The aqueous solution was passed through a column of 40 g. of Dowex 50 in the acid phase and the column was washed with 40 ml. of water. The combined eluates were evaporated to dryness. There was thus obtained 0.8 g. of D(+)pantothenic acid 2-diethyl phosphite in the form of an oil.

*Analysis.*—Calcd. for $C_{13}H_{26}NO_7P$: C, 46.01; H, 7.72. Found: C, 46.26; H, 8.13.

In similar manner, but replacing D(−)pantolactone 2-diethyl phosphite by D(−)pantolactone 2-di-n-propyl phosphite, 2-di-n-butyl phosphite, 2-di-n-amyl phosphite, 2-dibenzyl phosphite, 2-diphenyl phosphite, 2-diallyl phosphite, 2-dimethallyl phosphite, 2-di-2′-butenyl phosphite, 2-di(1-benzylethyl) phosphite and 2-diphenethyl phosphite there are obtained D(+)pantothenic acid 2-di-n-propyl phosphite, 2-di-n-butyl phosphite, 2-di-n-amyl phosphite, 2-dibenzylphosphite, 2-diphenyl phosphite, 2-diallyl phosphite, 2-dimethallyl phosphite, 2-di-2′-butenyl phosphite, 2-di(1-benzylethyl) phosphite and 2-diphenethyl phosphite, respectively.

EXAMPLE 2.—BARIUM SALT OF D(+)PANTOTHENIC ACID 2-DIETHYL PHOSPHITE

A solution of 0.7 g. of D(+)pantothenic acid 2-diethyl phosphite (prepared as described in Example 1) in 15 ml. of water was treated with 10.5 ml. of aqueous 2 N barium hydroxide solution. The resulting solution had a pH of 8.5. The solution was saturated with carbon dioxide, heated to 60° C. and filtered. The filtrate was evaporated to dryness in vacuo. The residue was dissolved in 10 ml. of methanol and the solution was filtered. The filtrate was poured into 100 ml. of anhydrous ether and the solid which separated was isolated by filtration and dried at 50 C. There was thus obtained the barium salt of D(+)pantothenic acid 2-diethyl phosphite in the form of a solid; [α] +17° (ethanol).

*Analysis.*—Calcd. for $C_{26}H_{50}BaN_2O_{14}P_2 \cdot 3H_2O$: C, 35.98; H, 6.49. Found: C, 35.79; H, 6.17.

EXAMPLE 3.—CALCIUM SALT OF D(+)PANTOTHENIC ACID 2-DIETHYL PHOSPHITE

A solution of 22 g. of D(+)pantothenic acid 2-diethyl phosphite (prepared as described in EXAMPLE 1) in 250 ml. of water was treated with 8.0 g. of calcium carbonate. The mixture was stirred for 10 minutes before being filtered. The filtrate was lyophilized. There was thus obtained 17.3 g. of the calcium salt of D(+)pantothenic acid 2-diethyl phosphite in the form of a glass.

EXAMPLE 4.—D(+)PANTOYLTAURINE 2-DIETHYL PHOSPHITE

To a solution of sodium methoxide, obtained by dissolving 0.46 g. (0.02 mole) of sodium in 50 ml. of anhydrous methanol, was added 2.5 g. (0.02 mole) of taurine. The solution so obtained was treated with 2.5 g. (0.0093 mole) of D(−)pantolactone 2-diethyl phosphite (prepared as described in EXAMPLE 1a). The resulting mixture was maintained at 26° C. with stirring for 12 hours, after which the reaction mixture was evaporated to dryness. The residue was heated at 130° C. for 10 minutes and then at 185° C. for 1 minute. The residue was then cooled, dissolved in 50 ml. of methanol as completely as possible, and the solution was filtered. The filtrate was then passed through a column of 40 g. of Dowex 50 in the acid phase (previously washed with methanol) and the column was washed with 40 ml. of methanol. The combined eluates were concentrated to approximately 15 ml. and the concentrate was poured into 100 ml. of ethyl acetate. The oil which separated was isolated by decantation and dried in vacuo. There was thus obtained D(+)pantoyltaurine 2-diethyl phosphite in the form of an oil.

In similar manner, but replacing D(−)pantolactone 2-diethyl phosphite by D(−)pantolactone 2-di-n-propyl phosphite, 2-di-n-butyl phosphite 2-di-n-amyl phosphite, 2-dibenzyl phosphite, 2-diphenyl phosphite, 2-diallyl phosphite, 2-dimethallyl phosphite, 2-di-2′-butenyl phosphite, 2-di-(1-benzylethyl) phosphite and 2-diphenethyl phosphite there are obtained D(+)pantoyltaurine 2-di-n-propyl phosphite, 2-di-n-butyl phosphite, 2-di-n-amyl phosphite, 2-dibenzyl phosphite, 2-diphenyl phosphite, 2-diallyl phosphite, 2-dimethallyl phosphite, 2-di-2′-butenyl phosphite, 2-di-(1-benzylethyl) phosphite and 2-diphenethyl phosphite, respectively.

EXAMPLE 5.—CALCIUM SALT OF D(+)PANTOYLTAURINE 2-DIETHYL PHOSPHITE

A solution of 5.0 g. of D(+)pantoyltaurine 2-diethyl phosphite (prepared as described in EXAMPLE 4) in 25 ml. of methanol was clarified by filtration. To the filtrate was added 15 ml. of water, followed by 15 g. of calcium carbonate. The mixture was stirred for 10 minutes and then filtered. The filtrate was poured into 150 ml. of acetone and the material which separated was isolated by decantation, washed with acetone and dried in vacuo at 50° C. There was thus obtained 3.42 g. of the calcium salt of D(+)pantoyltaurine 2-diethyl phosphite in the form of an amorphous powder; [α] +19° (80% ethanol).

EXAMPLE 6.—N-(2,4-DIHYDROXY-3,3-DIMETHYLVALERYL)-β-ALANINE 2-DIETHYL PHOSPHITE

Using the procedure described in Example 1a but substituting 3,3-dimethyl-2-hydroxy-γ-valerolactone (Drell et al., supra) for pantolactone, there is obtained 3,3-dimethyl-γ-valerolactone 2-diethyl phosphite. The latter compound is then reacted with the sodium salt of β-alanine, according to the procedure described in Example 1b, to obtain N-(2,4-dihydroxy-3,3-dimethylvaleryl)-β-alanine 2-diethyl phosphite.

EXAMPLE 7.—N-(2,4-DIHYDROXY-3,3-DIMETHYLVALERYL)-TAURINE 2-DIETHYL PHOSPHITE

Using the procedure described in Example 4, but replacing pantolactone 2-diethyl phosphite by 3,3-dimethyl-γ-valerolactone 2-diethyl phosphite (prepared as described in Example 6) there is obtained N-(2,4-dihydroxy-3,3-dimethylvaleryl)-taurine 2-diethyl phosphite.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the class consisting of (a) compounds having the formula:

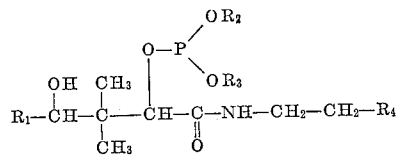

wherein $R_1$ is selected from the class consisting of hydrogen and methyl, $R_2$ and $R_3$ are selected from the class consisting of alkyl containing from 1 to 6 carbon atoms, inclusive, alkenyl containing from 3 to 6 carbon atoms, inclusive, aralkyl containing from 7 to 13 carbon atoms, inclusive, and aryl containing from 6 to 12 carbon atoms, inclusive, and $R_4$ is selected from the class consisting of —COOH and —SO₃H, and (b) the alkali metal and alkaline earth metal salts thereof.

2. D(+)pantothenic acid 2-diethyl phosphite.

3. The calcium salt of D(+)pantothenic acid 2-diethyl phosphite.

4. The barium salt of D(+)pantothenic acid 2-diethyl phosphite.

5. D(+)pantoyltaurine 2-diethyl phosphite.

6. The calcium salt of D(+)pantoyltaurine 2-diethyl phosphite.

7. A process for the preparation of an acid having the formula:

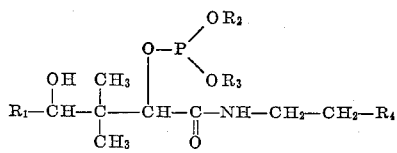

wherein $R_1$ is selected from the class consisting of hydrogen and methyl, $R_2$ and $R_3$ are selected from the class consisting of alkyl containing from 1 to 6 carbon atoms, inclusive, alkenyl containing from 3 to 6 carbon atoms, inclusive, aralkyl containing from 7 to 13 carbon atoms, inclusive, and aryl containing from 6 to 12 carbon atoms, inclusive, and $R_4$ is selected from the class consisting of —COOH and —SO$_3$H, which comprises reacting in the presence of an inert solvent a lactone having the formula:

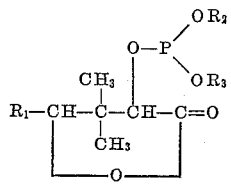

wherein $R_1$, $R_2$, and $R_3$ have the significance hereinbefore defined, with a compound selected from the class consisting of alkali metal salts and alkaline earth metal salts of an amino acid having the formula NH$_2$—CH$_2$—CH$_2$—R$_4$ wherein $R_4$ has the significance hereinbefore defined to give the corresponding salt of the desired acid, and liberating the desired acid from the salt so obtained.

8. The process of claim 7 wherein the lactone and the salt of the amino acid are reacted at a temperature within the range of about 20° C. to about 30° C.

9. A process for the preparation of a pantothenic acid 2-di-lower-alkyl phosphite which comprises reacting in the presence of an inert solvent a pantolactone 2-di-lower-alkyl phosphite with an alkali metal salt of β-alanine and liberating the desired free acid from the alkali metal salt of pantothenic acid 2-di-lower-alkyl phosphite so obtained.

10. The process of claim 9 wherein the pantolactone 2-di-lower-alkyl phosphite and the alkali metal salt of β-alanine are reacted at a temperature of about 20° C. to about 30° C.

11. A process for the preparation of a pantoyltaurine 2-di-lower-alkyl phosphite which comprises reacting in the presence of an inert solvent a pantolactone 2-di-lower-alkyl phosphite with an alkali metal salt of taurine and liberating the desired free acid from the alkali metal salt of pantoyltaurine 2-di-lower-alkyl phosphite so obtained.

12. The process of claim 11 wherein the pantolactone 2-di-lower-alkyl phosphite and the alkali metal salt of taurine are reacted at a temperature of about 20° C. to about 30° C.

No references cited.

UNITED STATES PATENT OFFICE
CERTIFICATE OF CORRECTION

Patent No. 3,017,423                                January 16, 1962

Barney J. Magerlein et al.

It is hereby certified that error appears in the above numbered patent requiring correction and that the said Letters Patent should read as corrected below.

Column 3, lines 35 to 40, the formula should appear as shown below instead of as in the patent:

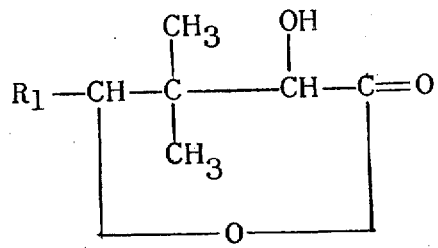

Signed and sealed this 8th day of May 1962.

(SEAL)
Attest:

ERNEST W. SWIDER

Attesting Officer

DAVID L. LADD

Commissioner of Patents